United States Patent [19]

McNeary

[11] 4,078,151
[45] Mar. 7, 1978

[54] ELECTRONIC GRAPHICS PAD

[75] Inventor: James J. McNeary, Sun Prairie, Wis.

[73] Assignee: Wisconsin Alumni Research Foundation, Madison, Wis.

[21] Appl. No.: 733,428

[22] Filed: Oct. 18, 1976

[51] Int. Cl.² .................. G08C 9/06; G08C 21/00
[52] U.S. Cl. .................................. 178/18; 250/210
[58] Field of Search .............. 250/210, 221, 222, 578; 178/18, 19, 20; 340/365 P, 324 M, 347 DD

[56] References Cited

U.S. PATENT DOCUMENTS 3,613,066  10/1971  Cooreman ........................... 178/18

Primary Examiner—Thomas A. Robinson
Attorney, Agent, or Firm—Howard W. Bremer

[57] ABSTRACT

A graphics panel is disclosed which translates any random trace of a point light source across the panel into voltage indicative of orthogonal components of the displacement of the light source. By means of such electrical signals a replica of the trace of the light source may be generated by a cathode ray tube, X-Y Plotter, or similar analog devices. The display panel is a flat planar structure composed of transparent plastic material having one side rendered opaque. A plurality of photoconductors are arrayed along the peripheral side of the panel and appropriate electrical circuits incorporating the photoconductors convert the current generated thereby into the voltages proportional to the displacement of the light source along orthogonal axes in the plane of the panel.

9 Claims, 5 Drawing Figures

ELECTRONIC GRAPHICS PAD

BACKGROUND OF THE INVENTION

A variety of devices have been utilized in the prior art to translate the displacement of a point of a stylus into electrical signals indicative of the displacement of that stylus point along orthogonal axes on a plane or panel. Typical examples of such prior art devices are those that are described in U.S. Pat. No. 3,886,311 wherein a writing pen is utlized together with means for detecting time varying electrostatic field components created by the writing pen on a writing table capable of generating unique electrostatic fields. In such a device, means are provided for transmitting information related to and defined by the position of the sensor within the electrostatic field for determination of stylus point position. Other devices, such as those shown in U.S. Pat. No. 3,626,483 employ acoustic elements as the apparatus for position determination of a stylus tip. U.S. Pat. No. 3,911,215 shows a construction having an array of pressure sensors respective to pressure generated by a stylus tip for generation of voltage signals indicative of stylus position. A yet further type of device developed in the prior art is that disclosed in U.S. Pat. No. 3,790,709 wherein the instantaneous contact pressure of a probe on a piezoelectric plate provides a displacement-indicative signal. Additionally, electroacoustic sensors have been utilized which utilize a planar screen upon which an image or a pattern is projected, that when tapped at a particular point by a stylus, generates electrical signals representative of the coordinates in a plane of the point tapped. Such a device is disclosed in U.S. Pat. No. 3,857,022.

All of the above described devices utilized expensive panels which are structurally complex, which employ discrete sensor arrays and are limited in the determination of the exact position of a stylus point. Those which employ piezo electric, acoustic, or electrostatic sensing structures or which utilize resistance grids are subject to inaccuracies from temperature-induced drift, from changes in physical configuration due to temperature, as well as wear and deterioration where physical contact with the sensor, by the stylus, is necessary. In those devices where there is contact between stylus and surface, and those which employ optical sensors, cleanliness of the writing panel is also a problem.

With such drawbacks in mind, the present invention has as one of its objects creation of a simple structure lending itself to an inexpensive manufacturing process and increased resolution to enhance the fidelity of the device. A further object is the elimination of a sensitivity to wear encountered in many prior art devices. A still further object of the present invention is the reduction of possible environmental influences on performance, such as ambient temperature.

These as well as other objects and advantages are obtained by the graphic input device of the invention which utilizes a transparent flat panel, one side of which is rendered opaque, where a plurality of photoconductors are arrayed about the periphery thereof. This structure is simple, inexpensive to manufacture and capable of being utilized to provide analog output signals which in turn are capable of increasing overall resolution of the device. The individual photoconductors are arranged in a bridge circuit that also increases accuracy of the device and which is relatively stable to environmental influence. Furthermore, because the photoconductors age in a linear manner, an arrangement of them in a bridge configuration automatically compensates for aging and is also susceptible of adjustment to changes in operating characteristics. Because the sensors according to the invention may be arrayed about the periphery of a panel, and not imbedded therein, the physical construction of the graphic panel of the invention is simple and inexpensive to construct. Also, because the invention utilizes a point light source as a stylus or cursor, it is not susceptible to deterioration due to frictional wear nor is it susceptible to degradation resulting from lack of absolute panel cleanliness necessary in resistive type devices.

Further objects and advantages of the present invention as well as further novel features thereof may best be understood from the following description, when read in conjunction with the accompanying drawings in which.

DESCRIPTION OF PREFERRED EMBODIMENTS

Figure 1:
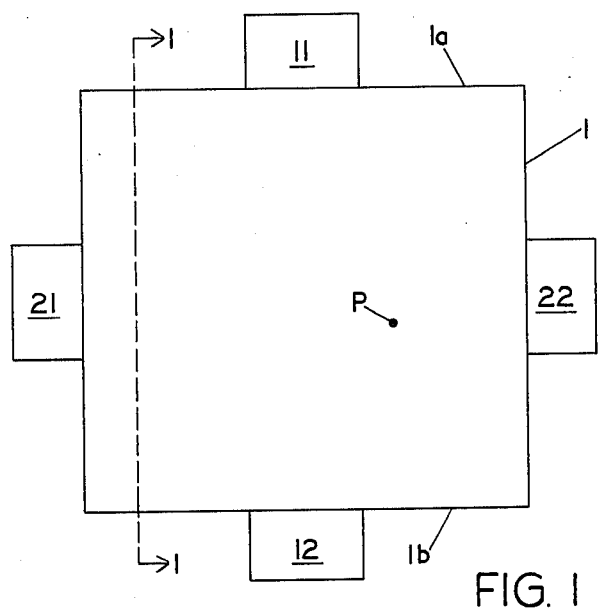
FIG. 1 shows planar view of an embodiment of the invention with four photoconductors arranged at the sides of the panel.

FIG. 1 illustrates one of two embodiments described herein. In the particular embodiment shown in this Figure, a panel 1 is provided which is of generally rectangular shape as shown and has four photoconductors 11, 12, 21, 22 arranged on sides thereof. The photoconductors operate in such a manner that the change in resistance thereof is proportional to the intensity of the incoming light signals received by them. Such intensities from a uniform light source vary in a manner inversely proportional to the distance from that source.

The array of photoconductors should be of such physical configuration that the resultant resistance variation thereof, due to the position "P" of a light cursor, or stylus, will provide the necessary voltage differential in a compound bridge arrangement, described below, to define co-ordinate values for the light-cursor position "P". Such a configuration where four photoconductors are utilized is shown in FIG. 1 where each photoconductor is located at a side of the rectangularly shaped panel 1.

Figure 2:
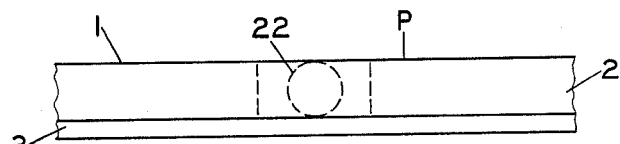
FIG. 2 shows the panel in sectional view along the lines 1—1 of FIG. 1.

FIG. 2 shows the panel 1 of FIG. 1 in cross section along the line 1 — 1 in the former figure. In order that light transmission from point source "P" be transmitted uniformly, plate 1 is structurally comprised of a thin sheet 2 of clear transparent plastic such as Plexiglas typically on the order of one-fourth inch in thickness. One of the flat large planar surfaces of the sheet 2 is rendered opaque by a lightly colored material such as white acrylic paint applied to the surface, or by a sheet of lightly-colored opaque material in contact therewith. The point of light "P" in FIG. 2 whose position is to be translated into electric signals should be brought close to the surface of the transparent sheet 2, on the side opposite the opaque coating 3.

Figure 3:
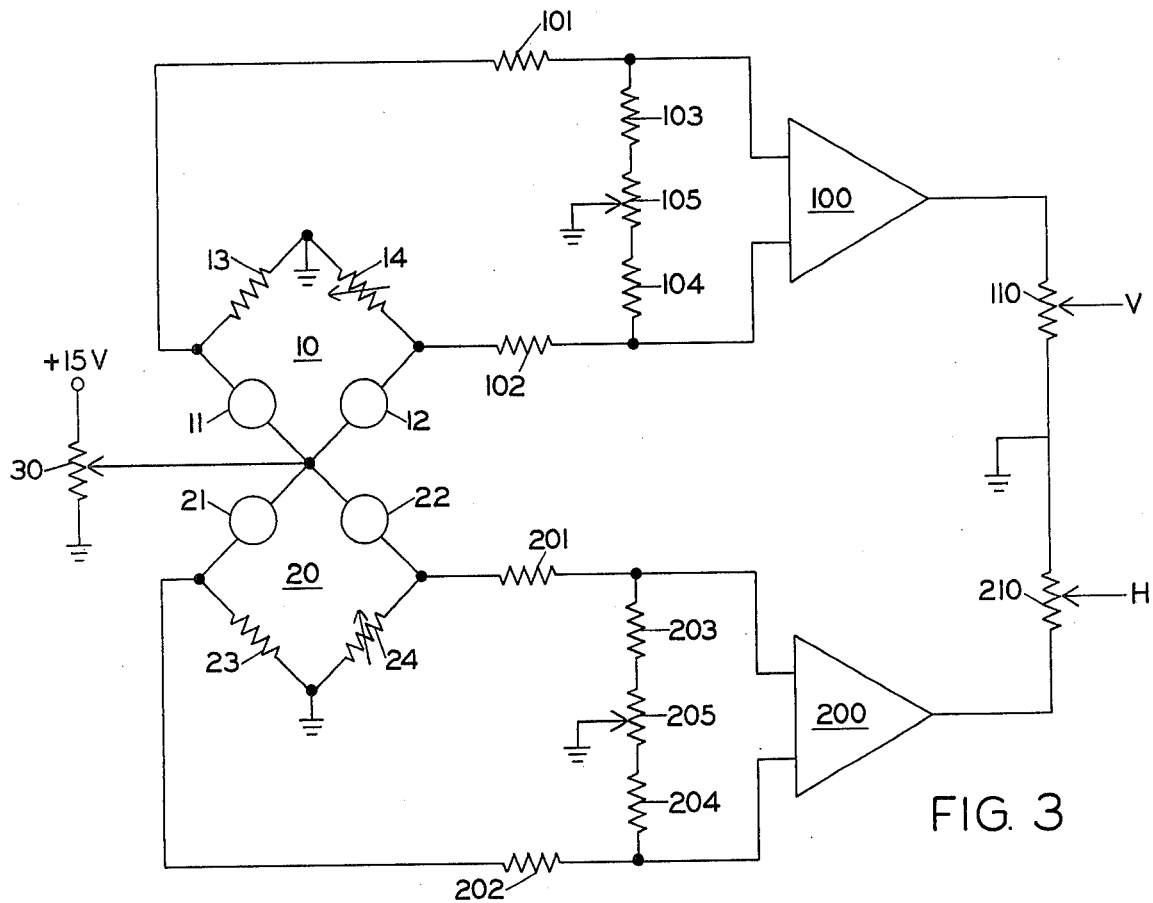
FIG. 3 shows a circuit configuration utilized in conjunction with the photoconductors to generate voltages indicative of the displacement of a point light source about the planar surface of the panel of FIG. 1.

FIG. 3 shows the electric circuitry useful for generating voltage signals, each of which is indicative of the position of a point light source adjacent to the surface of the panel 1. In the circuit illustrated, the individual photoconductors 11, 12, 21 and 22 of the device illustrated in FIG. 1 are arranged in a pair of bridge circuits 10 and 20. In bridge circuit 10, the photoconductor 11 and photoconductor 12 form two legs of the resistance bridge with the resistance 13 and a variable resistance 14 forming the two other legs. The junction between the fixed resistance 13, and the variable resistance 14 is connected to a common point, while the connection between the two photoconductors 11 and 12 is kept at a voltage above common at the wiper of potentiometer 30. On this potentiometer one terminal is connected to ground, the other terminal being connected to a 15 volt DC power source. An output signal from bridge 10 is derived across the remaining two terminals of the bridge, one of which forms a connection between photoconductor 11 and resistance 13, the other which forms a connection between photoconductor 12 and variable resistance 14. Each of these terminals are connected to one of two inputs of the amplifier 100 by means of a resistance 101 for one node and a resistance 102 for the other. Across the two inputs of amplifier 100 is connected a balancing circuit comprising a resistance 103, a resistance 104, and the potentiometer 105 the wiper of which is connected to common potential.

Similarly for bridge 20 the photoconductors 21 and 22 form two legs of the bridge, the node forming a junction therebetween also being connected to the wiper of potentiometer 30 in common with bridge 10. Resistance 23 and variable resistance 24 form the two remaining legs of bridge 20 with the node connecting the two resistances 23 and 24 being connected to a common potential. The output of bridge 20 is taken between the node connecting photoconductor 22 with variable resistance 24 and the node connecting photoconductor 21 with resistance 23. The former node is connected via resistance 201 to one input of an amplifier 200, the latter node being connected by means of a resistance 202 to another input of amplifier 200. In a similar fashion to the amplification circuits described with regard to bridge 10, a balancing network is provided consisting of resistances 203 and 204 connected by a potentiometer 205 whose wiper is connected to a common node. This balancing network is placed across the two input terminals of amplifier 200. Both amplifiers 100 and 200 are differential amplifiers in that they amplify the difference of the two signals placed at the two inputs of each amplifier.

The outputs of the amplifiers 100 and 200 are respectively connected to one terminal of potentiometers 110 and 210. The remaining terminals of these two potentiometers are connected to a common potential with the wiper of each forming an output. A particular use for the circuit shown is to feed voltages to the vertical and horizontal input channels of a cathode ray tube such as would be found in a cathode ray oscilloscope, or to a chart recorder, X-Y plotter of some similar analog output device.

Figure 4:
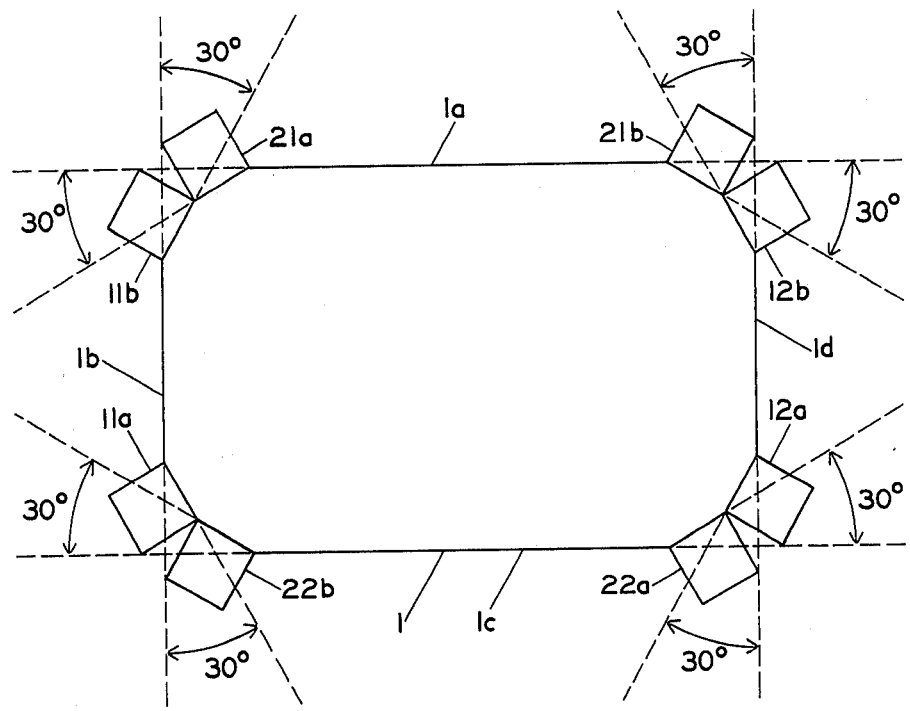
FIG. 4 shows an alternative embodiment utilizing eight rather than four photoconductors.

An alternative embodiment to those previously described is shown in FIG. 4. In this Figure eight photoconductors are utilized at the corners of the panel 1. For example, in the upper left corner shown in FIG. 4 two photoconductors 21a and 11b are located roughly at the corner of panel 1. As is shown photoconductor 21a forms an angle of 30° with side 1a of panel 1 and photoconductor 11b forms an angle of 30° with the side 1b of panel 1. At the lower left hand corner photoconductor 11a forms a 30° angle with side 1b of panel 1 while photoconductor 22b forms at 30° angle with side 1c of panel 1 which is parallel to side 1a. The upper right hand corner in FIG. 4 shows photoconductors 12b and 21b, each of which forms an angle of 30° with side 1d and 1a respectively, side 1d being the side parallel to side 1b. In a similar manner at the lower right hand corner photoconductor 12a and 22a form 30° angles with side 1d and 1c respectively.

The number of photoconductors and the angles at which the photoconductors are arrayed in the embodiment of FIG. 4 have been chosen so that a faithful and accurate determination of cursor position is assured, eliminating any possible "dead spots" in the response of the circuitry and photoconductor configuration to cursor position.

Figure 5:
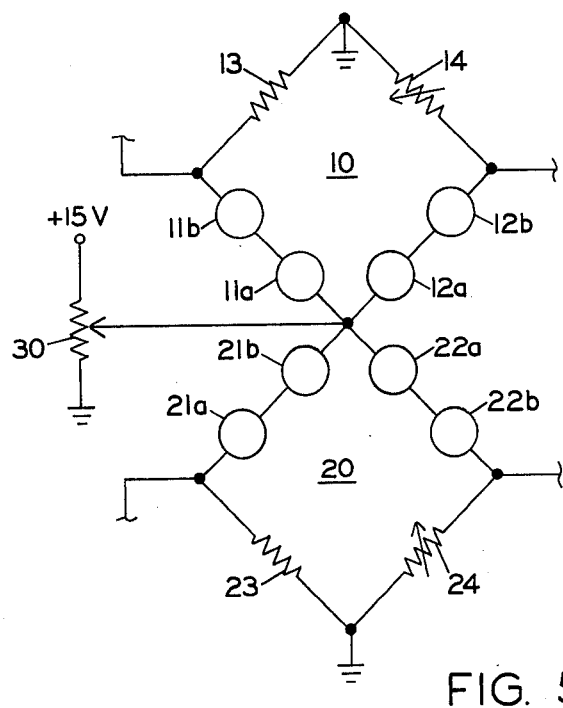
FIG. 5 shows in partial section circuit modifications necessary for the incorporation of the eight photoconductor arrangement in FIG. 4.

FIG. 5 shows how the bridge circuits 10 and 20 are modified to effect the incorporation of eight photoconductors arrayed as shown in FIG. 4. The arrangement of FIG. 4 and the circuit embodiment of FIG. 5 enhance both accuracy and sensitivity, allowing a larger panel 1 to be used. As will be noted from comparing FIGS. 4 and 5, two photoconductors along the same edge of panel 1, i.e., 11a and 11b, 12a and 12b, 21a and 21b, and 22a and 22b, form the individual legs of the bridges 10 and 20.

In both FIGS. 3 and 5 for the bridge circuits 10 and 20 variable resistances 14 and 24 are utilized to effect balance of the bridges when the point source of light of the cursor is placed at roughly the center of panel 1. Potentiometer 30 is utilized to define the range of voltages produced by available bridge output voltages. Inputs to each of the amplifiers 100 and 200 are balanced by means of potentiometers 105 and 205 respectively, while the output range for each of the amplifiers is controlled respectively by potentiometers 110 and 210.

In operation the user may utilize a point light source such as would be available from a pen light, or more accurately from a light pen using a fiber optic tip whereby the light source may be effectively concentrated. The tip preferentially should be brought close to the surface before any light is caused to be emitted therefrom in order to minimize the amount of "spill over" or random light; this can otherwise create disturbing background noise with corresponding minor inaccuracies in the voltages derived in response to the trace of light. In this regard it may be useful to incorporate within the pen light, or fiber optic pen, a microswitch which enables the user to bring the tip of the light source into contact with the panel 1 before the light source for the particular pen is energized. Energization can therefore take place subsequently by changing the state of the microswitch.

In operation, and referring to the circuits illustrated in both FIG. 3 and FIG. 5, movement of a point light source about the surface of the panel 1 creates unbalanced conditions for both bridges 10 and 20 by changing the effective resistance of the photoconductor elements comprising the legs of those bridges. Accordingly the output voltages from both bridges are caused to vary by the movement of the point light source. Such bridge output voltages are amplified by amplifier circuits 100 and 200 and by appropriate circuitry routed through a particular utilization device. Devices as mentioned capable of utilizing such signals include cathode ray tubes, X-Y plotters, and like display devices.

In order that those skilled in the art may more readily be able to make and use an embodiment of the present invention, particular circuit elements and values therefor are given below in the following table.

| Photoconductors | |
|---|---|
| 11, 12, 21, 22, 11a, 11b, 12a, 12b, 21a, 21b, 22a, 22b | |
| Resistors | |
| 13, 23 | 1960Ω |
| 14, 24 | ≅ 2500Ω(variable) |
| 30 | ≅ 50KΩ(variable) |
| 101, 102, 201, 202 | 46.3KΩ |
| 103, 104, 203, 204 | 12KΩ |
| 105, 205 | ≅ 50KΩ(variable) |
| 110, 210 | 5KΩ |
| Amplifiers | |
| 100, 200 | 741(Fairchild) |

The graphics panel of the invention is capable of a wide variety of uses. Such uses include communication by means of a telephone link. Such communication is possible because the output voltages capable of being generated by the circuitry described are compatible with the voltages normally utilized in telephone lines for conveying speech-carrying signals. In such a manner the handicapped, the deaf and mute, or others confined to the home can communicate with schools, for instance, in a written manner. Such graphic panels according to this invention are also capable of utilization for signature verification for business transactions utilizing computer memory wherein signature may be compared to a stored signature facsimile. In technical or scientific applications, it is possible to integrate or differentiate a curve which may be traced by means of the light stylus by multiplying the horizontal by the vertical signals. The device may also be useful for input to numerical control systems for machine tool operation.

While having shown and described particular embodiments of the present invention it is to be understood by those skilled in the art that various modifications and changes may be made to the embodiments shown and described therein without departing from the spirit and scope of the present invention as defined in the appended claims.

What is claimed is:

1. A device for the conversion of the position of a source of light on a planar surface into electrical signals representative of the position of said source on said surface comprising:
    (a) a flat substantially transparent panel having opposite flat surfaces and at least one side connecting said flat surfaces and defining the periphery of said panel, one of said flat surfaces being rendered opaque,
    (b) a plurality of photoconductors arrayed about the periphery of said panel and mounted in position to receive light transmitted through said peripheral side of said panel, and
    (c) means for creating a pair of voltages responsive to the changes of resistance of said photoconductors, said voltages cooperating to indicate the position of a source of light on the panel in two orthogonal directions.

2. The device of claim 1 wherein the panel is substantially rectangular in shape, one of said photoconductors being located on each side of said rectangular panel.

3. The device of claim 2 wherein said photoconductors are disposed at corners at angles with respect to the sides of said rectangular panel.

4. The device of claim 3 wherein two of said photoconductors are arranged at angles of 30° to each of two parallel sides of said rectangular panel.

5. The device of claim 3 wherein two of said photoconductors are arranged at angles of 45° to each of two parallel sides of said rectangular panel.

6. The device of claim 2 wherein pairs of said photoconductors are disposed at corners, each photoconductors of each pair being disposed at an angle with respect to one of the mutually perpendicular sides of said rectangular panel.

7. The apparatus of claim 6 wherein each of said angles is 30°.

8. The apparatus of claim 1 wherein each of said photoconductors forms a leg of one of two bridge circuits, each of said bridge circuits having resistance elements forming two legs thereof, and wherein each of said bridge circuits generates a voltage across two legs thereof corresponding to the position of a source of light along one of said orthogonal directions.

9. The device of claim 8 wherein electrical amplification is provided for each of said voltages corresponding to the orthogonal directions.

* * * * *